May 21, 1968 E. STRATEMEYER 3,383,806
MOTION CONTROL DEVICE FOR GRINDING TOOL
Filed June 22, 1965
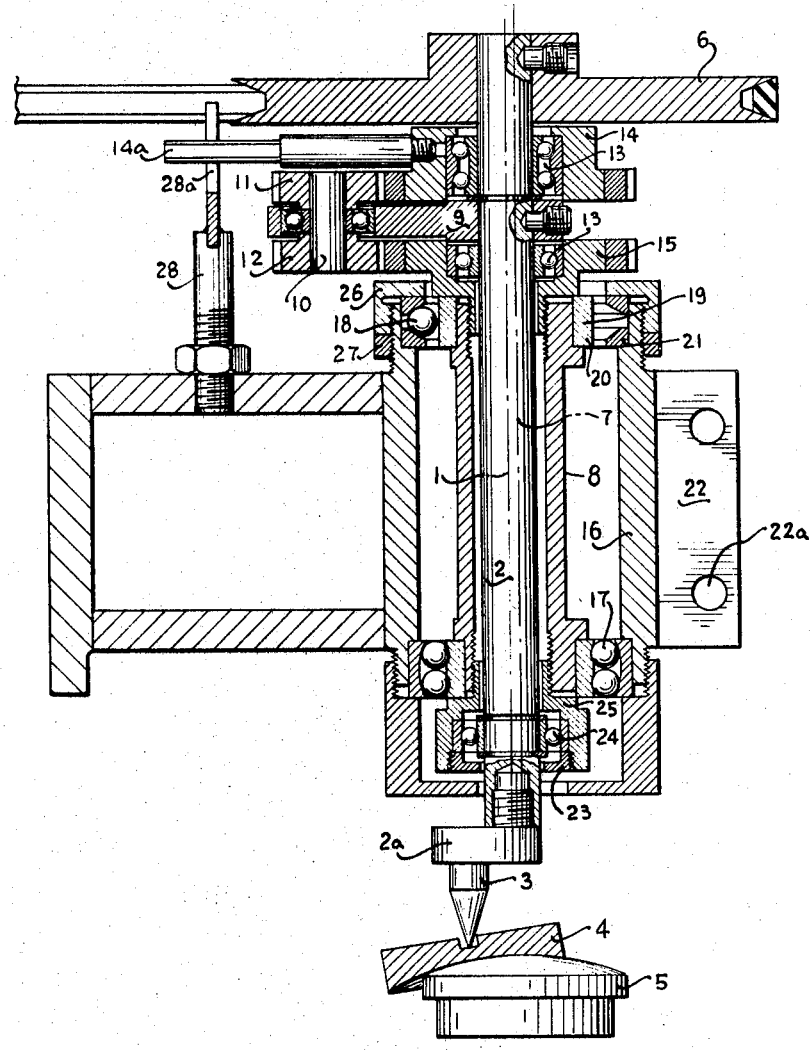
INVENTOR
Eugen Stratemeyer
BY
Michael J. Striker
ATTORNEY United States Patent Office 3,383,806
Patented May 21, 1968

3,383,806
MOTION CONTROL DEVICE FOR
GRINDING TOOL
Eugen Stratemeyer, Heckertstrasse 58,
Bochum, Germany
Filed June 22, 1965, Ser. No. 466,042
7 Claims. (Cl. 51—134.5)

ABSTRACT OF THE DISCLOSURE

A grinding tool is rotated about first and second axes to move along first and second paths, and also oscillated by a ball bearing having balls of different size to angularly oscillate along a third path whereby the tool moves in an irregular motion along a path composed of the first, second and third paths.

---

The present invention relates to a motion control device for a tool, and more particularly to a device for controlling the motions of a grinding tool during the grinding of optical lenses.

It is known to move the grinding tool along a path otbained by moving the tool in a regular cycle along a composite path obtained by simultaneous movement of the tool along two eccentric circles. However, the regular cyclic overlapping of the two circular motions of the grinding tool has the disadvantage that the tool grinds the same portion of the lens at regular intervals. As a result, surface portions of the lens are formed which do not conform to the intended curvature of the lens surface. The time required for polishing the lens is increased, and the quantity of the lens impaired.

It is one object of the invention to overcome this disadvantage of the prior art, and to provide a motion control device for a grinding or similar tool by which the tool is controlled to move in an irregular non-cyclic motion.

Another object of the invention is to provide a motion control device controlling a tool to move along a composite path obtained by three different motions of the tool.

Another object of the invention is to provide a grinding device for optical lenses which obtains the desired curvature of an optical lens.

Another object of the invention is to provide a motion control device causing movement of a tool along two overlapping circular paths, and simultaneous movement of the tool in an irregular angular oscillation.

Another object of the invention is to cause a tool-controlling spindle to simultaneously rotate about its own axis, revolve about a second parallel axis, and to perform an angular oscillation about a point of the second axis.

With these objects in view, the present invention relates to a motion control device which is particularly suited for controlling a grinding or polishing tool for an optical lens. One embodiment of the invention comprises first rotary actuating means, for example, a rotary spindle having a radially projecting portion for moving the tool along a first path; second rotary actuating means, preferably a sleeve-shaped holder supporting the spindle for rotation about the first axis for moving the tool along a second path excentric to the first path; and control means, preferably including an excentric ball bearing for controlling the second actuating means during the rotation thereof to move along a third path so that the tool moves along a composite path.

Drive means preferably inculding differential gear means drive the spindle and the holder in a rotary motion in the eccentric ball bearing so that the holder and the spindle perform a rocking motion about a point of the axis of rotatio of the holder determined by another ball bearing.

In the preferred embodiment of the invention, the eccentric ball bearing includes a ring with a cylindrical surface secured to the holder, an outer ring which is stationary and has two confronting frusto-conical surfaces, and balls of different diameter rolling on the surfaces so that the corresponding portion of the holder is displaced in an irregular motion in a direction transvere to the axes of the holder and the spindle. During the rocking motion of the spindle and the holder, the tool is moved along a third circular path.

Due to the fact that the two overlapping circular paths produced by the rotating spindle and holder are combined with a third path along which the tool moves in an irregular motion, no portion of the lens surface is ground at regular time intervals.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing whose single figure is an axial sectional view illustrating one embodiment of the invention.

Referring now to the drawing, a pulley 6 is secured by a screw to a rotary spindle 2 for rotating the same about its axis 1. Spindle 2 has a radial projection 2a to which a pointed pin 3 is secured radially spaced from axis 1. Pin 3 engages a recess in a grinding tool 4 which rests on the surface of an optical lens 5 to grind the same in accordance with the curvature of the grinding face of tool 4.

Spindle 2 is mounted for rotation about axis 1 in a holder including a sleeve 8 to which a gear 15 is secured by a threaded connection. A member 25 is secured to the other end of sleeve 8 by a threaded connection, and is closed by a cover 23. Ball bearings 13 and 24 provide the rotary support of shaft 2 in parts 15 and 25 of the holder, and ball bearing 24 has an inner ring abutting an annular shoulder of spindle 2 so that the axial pressure is taken up by member 25 which abuts a ball bearing 17 whose outer ring is secured to a stationary support 16. The inner ring of ball bearing 17 is secured to one end of sleeve 8, and the ball bearing 18 is secured to the other end of sleeve 8 so that the holder 8, 5, 25 is supported in support 16 for rotation about a second axis 7 parallel to axis 1 of spindle 2. When the holder and the spindle are simultaneously rotated, the rotation of the spindle about axis 1 will cause movement of tool 4 about a circular path. but since the spindle simultaneously revolves about axis 7, the tool will move along a path composed of two regularly overlapping circular paths.

Ball bearing 17 has an outer stationary ring with a spherical inner surface permitting an angular movement of the holder about a point of axis 7 where the center of the spherical surface is located.

Ball bearing 18 includes an inner ring 21 secured to sleeve 8 and having an outer cylindrical surface 19, and an outer ring 21 which has a pair of confronting frusto-conical inner surfaces opposite the cylindrical surface 19. The balls of ball bearing 18 are not of uniform size, but have diameters gradually increasing and decreasing around the circumference of the ball bearing. The balls roll on the outer cylindrical surface 19, and on the frusto-conical surfaces of the outer ring 21. It will be understood that a small ball located between the inner and outer rings will permit the inner and outer rings to approach each other as shown on the left side of the drawing, whereas a larger ball will move the inner and outer rings apart as shown on the right side of the drawing. Different circles on the frusto-conical surfaces will be engaged by larger and smaller balls. During rotation of sleeve 8 with the inner ring 21, the holder will perform an angular movement about the center point of bearing 17 on axis 7.

A carrier 9 is secured to spindle 1 by a screw, and has a ball bearing supporting the shaft 10 of a pair of planetary gears 11 and 12. Planetary gear 12 has a smaller diameter than planetary gear 11 and meshes with gear 15 which is secured to sleeve 8 and forms part of the holder. A ball bearing 13 is mounted between gear 15 and spindle 2 so that the spindle is supported in the holder for rotation about axis 1. Planetary gear 11 meshes with another gear 14 supported on spindle 2 by another ball bearing 13a. A projecting arm 14a is secured to gear 14, and engages a slide face 28a of a stop member 28 secured to supporting means 22 which has a pair of brackets embracing the cylindrical support 16 and being secured to each other by screws in holes 22a.

An adjusting ring 26 is threaded onto the upper end of support 16 and engages the outer ring 21 of ball bearing 18 so that the same can be adjusted or exchanged for obtaining different axial distances between the frusto-conical surfaces of the outer ring 21 which may be composed of a plurality of rings.

When spindle 2 is rotated by drive means 6, carrier 9 and planetary gears 11 and 12 rotate about axis 1. Sun gear 14 cannot turn since it is stopped by projection 14a abutting stop 28a, so that planetary gears 11 and 12 roll on gear 14 and planetary gear 12 drives Sun gear 15 so that sleeve 8 rotates about axis 7. The rotary speed of the holder 8, 15, 25 is slightly greater than the rotary speed of spindle 2, and spindle 2 revolves slowly about axis 7 so that pin 3 and tool 4 move along a composite path due to the overlapping and combined circular motions about axis 1 and axis 7.

During rotation of the holder with the inner ring 21 of ball bearing 18, balls of different diameter roll on different portions of the frusto-conical surfaces, and do not move at half the rotary speed of the rotating inner ring, as in conventional ball bearings. While the cage of the balls of a standard ball bearing has a transmission ratio of 1:2 compared with the rotary ring of the ball bearing, the transmission ratio of ball bearing 18 varies irregularly in accordance with a position of larger and smaller balls, and the upper end of sleeve 8 will perform a completely irregular transverse motion in directions transverse to the axis 7. Such movements of the upper end of sleeve 8 result in angular displacement of the holder with the spindle about a point on axis 7 determined by the spherical inner surface of the outer ring of ball bearing 17. Since this rocking movement is non-cyclical and irregular, tool 4 is moved by pin 3 in an irregular motion superimposed on the composite motion obtained by rotation of holder 8 about shaft 7 and simultaneous rotation of spindle 2 with projecting portion 2a about axis 1. As a result, no part of the tool engages the lens surface at regular time intervals, and no area of the lens surface is repeatedly ground by the same part of the tool.

During rocking movement of sleeve 8 and spindle 2, gears 14, 15, 11 and 12 also rock. Projecting stop arm 14a of gear 14 slides on stop face 28a during angular rocking of gear 14 with spindle 2 and ball bearing 13a.

The provision of two brackets 22 and screws in holes 22a permits an exchange of support 16 with all parts mounted thereon, or an axial adjustment of the position of support 16 and pin 3 in relation to a workpiece 5. This simple construction permits adaptation of the device to different lenses.

The device is not only suited for grinding the lenses of spectacles, but also for the grinding of very large telescopic lenses which are ground manually at the present time.

It will be understood that each of the elements described above, or two or more together, may also find a useful application in other types of motion control devices for tools differing from the types described above.

While the invention has been illustrated and described as embodied in a device for moving a grinding tool in an irregular composite motion during the grinding of a lens, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Motion control device for a tool, comprising, in combination, first rotary actuating means for moving the tool along a first path and having a first axis; second rotary actuating means for moving said first actuating means along a second path eccentric to said first path and having a second axis substantially parallel to said first axis; and supporting means having a first ball bearing supporting said second rotary actuating means for rotation about said second axis, and for angular movement about a point of said second axis, and a second ball bearing having a stationary ring, a rotary ring secured to said second rotary actuating means for rotation therewith, and balls having different diameters located between said rings, said second ball bearing controlling said second rotary actuating means during rotation thereof to oscillate angularly in said first ball bearing so as to move along a third path so that said tool moves along a path composed of said first and second paths and of said third path.

2. Motion control device for a tool, comprising, in combination, first rotary actuating means for moving the tool along a first path and having a first axis; second rotary actuating means for moving said first actuating means along a second path eccentric to said first path and having a second axis substantially parallel to said first axis; and supporting means having a first ball bearing supporting said second rotary actuating means for rotation about said second axis, and for angular movement about a point of said second axis, and a second ball bearing having a stationary ring having confronting frusto-conical surfaces, a rotary ring secured to said second rotary actuating means for rotation therewith having a cylindrical surface, and balls having different diameters located between said rings and rolling on said surfaces, said ball bearing controlling said second rotary actuating means during rotation thereof to oscillate angularly in said first ball bearing so as to move in an irregular motion along a third path so that said tool moves along a path composed of said first and second paths and of said third path.

3. Motion control device for a grinding tool, comprising, in combination, a rotary spindle having a first axis and a radially projecting portion for engaging a tool and for moving the tool about a first circular path; a rotary holder supporting said spindle for rotation about said first axis; supporting means having first and second bearing means spaced in axial direction and supporting said holder for rotation about a second axis of rotation parallel to said first axis of rotation so that said spindle revolves about said second axis along a second circular path, said first bearing means also supporting said rotary holder for angular movement about a point of said second axis, and said second bearing means being eccentric and also supporting said holder for movement transverse to said second axis, said second bearing means including a ball bearing having balls of different diameters for causing an irregular angular motion of said holder with said spindle about said point; and drive means connected to said spindle and said holder for simultaneously rotating the same about said first and second axes, respectively, whereby the tool moves along a path composed of said first and second circular path and of said third path.

4. Motion control device for a grinding tool, comprising, in combination, a rotary spindle having a first axis and a radially projecting portion for engaging a tool and for moving the tool about a first circular path; a rotary holding supporting said spindle for rotation about said first axis; supporting means having first and second bearing means spaced in axial direction and supporting said holder for rotation about a second axis of rotation parallel to said first axis of rotation so that said spindle revolves about said second axis along a second circular path, said first bearing means also supporting said rotary holder for angular movement about a point of said second axis, and said second bearing means being eccentric and also supporting said holder for movement transverse to said second axis, said second bearing means being a ball bearing including a stationary ring, a rotary ring secured to said holder for rotation therewith, and balls located between said rings and having different diameters for causing an irregular motion of said holder with said spindle about said point; and drive means connected to said spindle and said holder for simultaneously rotating the same about said first and second axes, respectively, whereby the tool moves along a path composed of said first and second circular path and of said third path.

5. Motion control device for a grinding tool, comprising, in combination, a rotary spindle having a first axis and a radially projecting portion for engaging a tool and for moving the tool about a first circular path; a rotary holding supporting said spindle for rotation about said first axis; supporting means having first and second bearing means spaced in axial direction and supporting said holder for rotation about a second axis of rotation parallel to said first axis of rotation so that said spindle revolves about said second axis along a second circular path, said first bearing means also supporting said rotary holder for angular movement about a point of said second axis, and said second bearing means being eccentric and also supporting said holder for movement transverse to said second axis, said second bearing means being a ball bearing including a stationary ring having confronting frusto-conical surfaces, a rotary ring secured to said holder for rotation therewith and having a cylindrical surface, and balls located between said rings rolling on said surfaces and having different diameters for causing an irregular motion of said holder with said spindle about said point; and drive means connected to said spindle and said holder for simultaneously rotating the same about said first and second axes, respectively, whereby the tool moves along a path composed of first and second circular path and of said third path.

6. A motion control device as set forth in claim 5 and including adjusting means engaging said stationary ring of said second bearing means for varying the distance between said confronting frusto-conical surfaces.

7. Motion control device for a grinding tool, comprising, in combination, a rotary spindle having a first axis and a radially projecting portion for engaging a tool and for moving the tool about a first circular path; a rotary holding supporting said spindle for rotation about said first axis; supporting means having first and second bearing means spaced in axial direction and supporting said holder for rotation about a second axis of rotation parallel to said first axis of rotation so that said spindle revolves about said second axis along a second circular path, said first bearing means also supporting said rotary holder for angular movement about a point of said second axis, and said second bearing means being eccentric and also supporting said holder for movement transverse to said second axis; drive means connected to said spindle and said holder for simulaneously rotating the same about said first and second axes, respectively, so that said second excentric bearing means causes during rotation irregular angular movements of said holder with said spindle about said point whereby the tool moves along a path composed of said first and second circular path and of said third path, said drive means including a means connected to said spindle for rotating the same, and a planetary gear means including a planetary gear carrier secured to said spindle, a first sun gear secured to said holder for rotation therewith, and a second non-rotatable sun gear; a stop means secured to said supporting means; and a member secured to said non-rotating sun gear and being in sliding engagement with a face of said stop means whereby said non-rotating sun gear is prevented from rotation, but can perform angular rocking movements with said rotary holder about said point.

References Cited
UNITED STATES PATENTS

| | | | |
|---|---|---|---|
| 1,343,050 | 6/1920 | Goodwin | 51—120 |
| 2,017,532 | 10/1935 | Elter | 51—120 X |
| 2,386,687 | 10/1945 | Jearum | 51—120 |
| 3,172,241 | 3/1965 | Habenicht | 51—120 |

FOREIGN PATENTS

| | | |
|---|---|---|
| 116,736 | 3/1943 | Australia. |
| 339,676 | 7/1921 | Germany. |

HAROLD D. WHITEHEAD, *Primary Examiner.*